(12) United States Patent
Fippel et al.

(10) Patent No.: US 8,489,542 B2
(45) Date of Patent: Jul. 16, 2013

(54) INTEGRATED CONTENT PUBLISHING

(75) Inventors: Bernhard Fippel, Heidelberg (DE); Siar Sarferaz, Speyer (DE)

(73) Assignee: SAP AG, Walldorf (DE)

( * ) Notice: Subject to any disclaimer, the term of this patent is extended or adjusted under 35 U.S.C. 154(b) by 342 days.

(21) Appl. No.: 12/888,944

(22) Filed: Sep. 23, 2010

(65) Prior Publication Data

US 2012/0078928 A1   Mar. 29, 2012

(51) Int. Cl.
 *G06F 17/00* (2006.01)
(52) U.S. Cl.
 USPC ............................ 707/600; 707/756; 707/803
(58) Field of Classification Search
 USPC ......................................... 707/600, 756, 803
 See application file for complete search history.

(56) References Cited

U.S. PATENT DOCUMENTS

| | | | |
|---|---|---|---|
| 7,665,064 B2 * | 2/2010 | Able et al. | 717/117 |
| 7,827,563 B2 * | 11/2010 | Westervelt et al. | 719/315 |
| 2004/0243587 A1 * | 12/2004 | Nuyens et al. | 707/100 |
| 2006/0106945 A1 * | 5/2006 | Westervelt et al. | 709/246 |
| 2006/0236306 A1 * | 10/2006 | DeBruin et al. | 717/113 |
| 2008/0017722 A1 * | 1/2008 | Snyder et al. | 235/494 |
| 2008/0168102 A1 * | 7/2008 | Parimi | 707/200 |
| 2008/0189206 A1 * | 8/2008 | Choi et al. | 705/39 |
| 2008/0189679 A1 * | 8/2008 | Rodriguez et al. | 717/105 |
| 2010/0023943 A1 * | 1/2010 | Arthurs et al. | 718/1 |

* cited by examiner

*Primary Examiner* — John E Breene
*Assistant Examiner* — Andalib Lodhi
(74) *Attorney, Agent, or Firm* — Kenyon & Kenyon LLP (57) ABSTRACT

Content objects may be incorporated as metadata in application systems in the same programming environment used to create the rest of the application. Although content objects may be included as part of the application systems, in some instances a central repository storing content object information from each application system may be used to facilitate communication and data sharing between applications. Alternatively, point-to-point communications between applications may also be supported so that applications may share content object data without relying on the central repository. Some embodiments may support both central repository communications and point-to-point communications between applications. Determinations may be made to identify the type of connectivity supported in different circumstances.

18 Claims, 6 Drawing Sheets

| Name | Category | Type | Occurr |
|---|---|---|---|
| ▼ SalesOrderCRMConfirmation | Element | SalesOrderCRMConfirmationMessage | |
| ▸ MessageHeader | Element | BusinessDocumentMessageHeader | 1 |
| ▼ SalesOrder | Element | SlsOrdCRMConfSlsOrd | 0..1 |
| ▸ ID | Element | SalesOrderID | 1 |
| ▸ BuyerID | Element | BusinessTransactionDocumentID | 0..1 |
| ProcessingTypeCode | Element | BusinessTransactionDocumentProcessingTypeCode | 1 |
| ▸ DataOriginCategoryCode | Element | CustomerTransactionDocumentDataOriginCategoryCode | 0..1 |
| Date | Element | Date | 0..1 |
| BuyerDate | Element | Date | 0..1 |
| ▸ Name | Element | MEDIUM_Name | 0..1 |
| ▸ SystemAdministrativeData | Element | SlsOrdCRM_sSystAdminvData | 1 |
| ▸ Status | Element | SlsOrdCRMConfSts | 1 |
| ▸ SalesAndServiceBusinessArea | Element | SlsOrdCRMConfSlsSrvcBusArea | 0..1 |
| ▸ BuyerParty | Element | SlsOrdCRMConfBuyrPty | 0..1 |

FIG. 6

INTEGRATED CONTENT PUBLISHING

BACKGROUND

Organizations use enterprise computing systems to manage different business processes through customizable applications that interact with each other. For example, enterprise resource planning (ERP) systems are computer-based systems that manage an organization's assets, financial resources, materials, and personnel. An ERP system landscape may include several different application components that may share data with each other. These application components may include a customer relationship management (CRM) system, an ERP application system, a warehouse management system, and a decision support system.

Existing ERP systems include a central design time repository that is accessible to each application component of the ERP system landscape. Content objects that are used in each application component are initially developed for inclusion in the central design time repository. Content objects identify fields, structure, and sources of data used in the application. This information may be stored as metadata in the central repository. Each time a new application is added to an ERP system landscape, the corresponding content objects used in the application must also be added to the central repository.

The central repository requirement in existing ERP system landscapes has several disadvantages. First, because content objects used in applications must be added to the central repository, developers writing new applications must also create content object metadata for inclusion in the central repository. This is cumbersome and inefficient for developers who may be familiar with certain programming languages used to create their application but not familiar with the structure or programming of the central design time repository, as the developers must invest additional resources in creating the content object metadata.

Additionally, the requirement also creates additional shipment and installation inefficiencies. This is because two separate shipment channels and installations may be needed to incorporate the new application in an ERP system. The first shipment channel may include software and/or hardware containing the new application, which may be installed as a separate system or as part of an existing system. The second shipment channel may include the application specific content object metadata for inclusion in the central repository. Aside from installing the application itself on an application system, the content object metadata must also be installed on the separate repository system storing the central content repository. Two shipment channels are typically used because the central repository system is structurally distinct from the application systems and also often located in another region.

Figure 1:
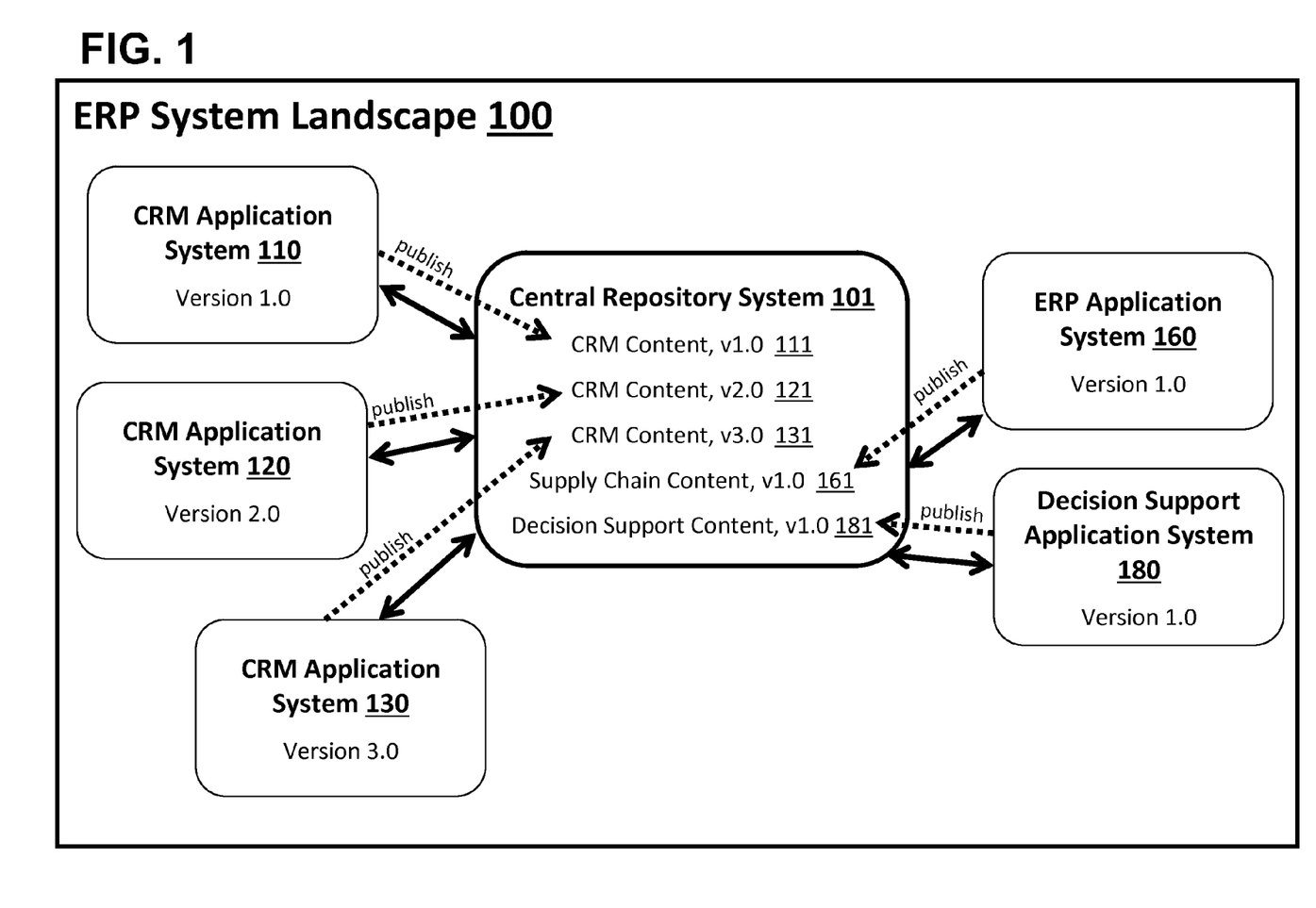
FIG. 1 shows an exemplary configuration of an existing system.

FIG. 1 shows an exemplary configuration of an existing ERP system landscape 100. This ERP system landscape 100 may have originally included a CRM application system 110, an ERP application system 160, and a central design time repository 101 storing content objects 111 and 161 for CRM system 110 and ERP application system 160, respectively. During runtime, the CRM 110 and ERP application 160 systems may communicate with the central repository 101 to access the content objects 111 and 161 associated with the respective application system 110 and 160. This communication is necessary because each of the content objects 111 and 161 identify fields, structure, and sources of data used in the respective application 110 and 160.

Once the ERP system landscape 100 has been deployed, developers may develop new applications or application upgrades or organizations may decide to addition functionality to their ERP system landscape 100. For example, a developer may release a new version 2.0 of a CRM system 120, followed later by an even newer version 3.0 of CRM system 130. Alternatively, an organization may decide to add another application system component, such as a decision support system 180, to include additional functionality in its ERP system landscape 100.

However, in each of these situations, in order to fully integrate these new systems 120, 130, and 180 in the existing ERP system landscape 100, the content objects 121, 131, and 181 for each of these respective new systems must also be added to the central repository 101.

There is a need for systems and methods where new applications added to an ERP system include self-contained content objects that do not have to be separate structured, formatted, and included in a central repository.

DETAILED DESCRIPTION

In embodiments of the invention, content objects may be incorporated in application systems. Content objects that are included as part of the application systems may be created in the same programming environment as the rest of the application, obviating the need for a developer to be familiar with multiple programming platforms. Furthermore, application systems may be shipped through a single shipment channel when content objects are incorporated in the application systems. Since all of the application components, including the content objects are included in the application system, installation may be completed by installing the application system.

Although content objects may be included as part of the application systems, in some instances a central repository storing content object information from each application system may be used to facilitate communication and data sharing between applications. Each application may use the central repository to identify fields, objects, and data received from and sent to other systems. For these situations, a publishing mechanism may be used to extract content object information from each application system, reformat the extract content object information into metadata recognized by the central repository, and store the reformatted metadata in the central repository. Communications between applications that depend on central repository metadata, such as encryption related communications and certain business-to-business communications, may still be supported by the publishing mechanism.

Alternatively, point-to-point communications between applications may also be supported so that applications may share content object data without relying on the central repository. In point-to-point mode, each application may be preprogrammed with the fields, objects, and other content identifiers used by the other applications for which point-topoint communications are enabled. This information is then used to correct identify data sent to and received from the other systems.

Some embodiments may support both central repository communications and point-to-point communications between applications. In these situations, an ERP system may be configured to use point-to-point communications for certain types of communications and central repository communications for other types. Alternatively, the ERP system may be configured to use one type of communication by default, such as point-to-point, and switch to the other type of communication if the default mode is not supported by an application.

Figure 2:
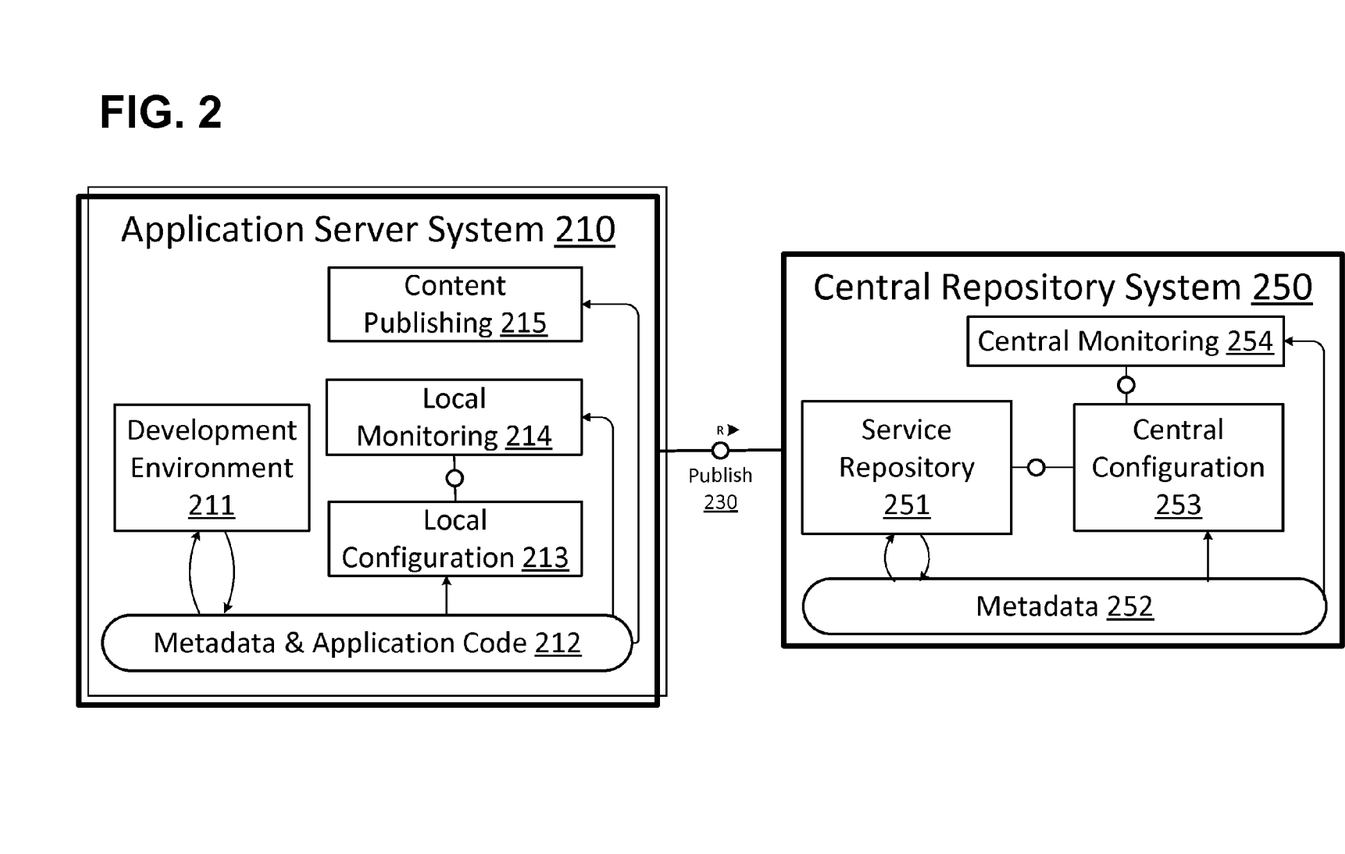
FIG. 2 shows an exemplary architecture of an embodiment of the invention.

FIG. 2 shows an exemplary architecture of an embodiment of the invention, including the components interacting with the content publishing mechanism. The exemplary architecture may include an application server system 210 and a central repository system 250. The application system 210 may include a development environment 211, metadata and code memory 212, local configuration information 213, local monitoring 214, and a content publishing mechanism 215.

The content publishing mechanism 215 may transfer content object metadata between different application systems 210. This transfer of metadata between systems may enable the connectivity and data sharing between the systems. If the metadata 212 in each application system 210 is stored in a same format, such as standard WSDL format, the publishing module 215 may initiate a direct transfer of content object metadata between application systems 210. If the formats are different, among others the content publishing mechanism 215 may be used to create an inbound interface corresponding to an existing outbound messaging interface of another application system to enable processing of received data.

The content publishing mechanism 215 may take the metadata 212 in the application system 210 and transform the metadata into a format recognized by a central repository system 250 or other system if operating in a point-to-point mode. The monitoring and configuration modules 214, 251, 213, 253, may be used to identify the proper format for each system and may enable the same metadata 212 to be reused with different systems having different formats by identifying the proper format for each system. The publishing module 215 may then take the transformed metadata and publish 230 it to the central repository system 250 or other system using an asynchronous enterprise service, such as a Simple Object Access Protocol (SOAP) message transmitted using Hypertext Transfer Protocol (HTTP) or secure HTTP. In some instances the publishing module may transfer metadata synchronously depending on the configuration of the system. In instances where the metadata stored in the central repository system 250 is in the same format as in the application system 210, no transformation may be need and the metadata may be simply transferred to the repository system 250.

The development environment 211 may be used to develop new enterprise services. During development of these new services, application code and/or metadata may be created to execute the new services at runtime. The created application code and/or metadata may be stored in memory 212. Code and metadata stored in the memory 212 may also be reused when developing new services in the development environment 211. Metadata that is stored in the memory 212 may be stored in a standard web services definition language (WSDL) format. The created metadata may define fields, objects, and other data used when executing the corresponding application code.

The application system 210 may also be configured for point-to-point and central repository based communications with other applications. Local configuration settings 213 may be customized to determine when point-to-point and central repository based communications may be used by content publishing mechanism 215. For example, local configuration settings 213 may include identifiers of applications supporting point-to-point communications and/or central repository based communications. Local configuration settings 213 may include conditions in which one of the communications protocols is to be used, such as using central repository based communications for encrypted communications or business-to-business communications. Local configuration settings 213 may also include formatting instructions for structuring point-to-point messages to be compatible with other applications or decoding messages received from other applications.

A local monitoring module 214 may interface with the local configuration settings 213 and monitor outbound and inbound messages to ensure compliance with the local configuration settings 213. Local monitoring module 214 may generate an error if unsupported messages are received at the application server system 210. Local monitoring module 214 may send instructions to other applications to switch to or use a particular type of communication, such as point-to-point communication, specified in the local configuration settings 213. Local monitoring module 214 may also monitor communications received from other applications specifying a type of communication, such as central repository based communications, used by the other application. The local monitoring module 214 may then ensure that subsequent communications with that application comply with the specified communication type, provided the local configuration setting 213 do not conflict.

The central repository system 250 may include a service repository 251, metadata 252, central configuration module 253, and a central monitoring module. The service repository 251 may be used to organize and structure metadata 252 stored in the central repository system 250. The service repository 251 may include tools and programs to parse metadata received from a content publishing module 215 and add the parsed metadata to the central repository metadata 252 in accordance with the structure used in the central repository system 250. Metadata 252 that is stored in the repository system 250 may be stored in a standard web services definition language (WSDL) format in some embodiments, though other embodiments may use different formats. The created metadata may define fields, objects, and other data used by different application systems 210.

A central configuration module 253 may be use to set and store configuration settings of the central repository 250. These configuration settings may be used to determine the structure, format, and tags used in the metadata 252. The configuration settings may also determine which applications may interface with the central repository system 250, the allowable formats of published 230 metadata content sent to the content repository system 250, and the conditions under which an application system 210 may used the central repository system 250. For example, central configuration module 253 settings may include identifiers of applications supporting central repository based communications. Central configuration module 253 settings may restrict central repository system 250 communications to applications systems 210 engaging in encrypted communications or business-to-business communications.

The central monitoring module 254 may interface with the central configuration module 253 settings to ensure compliance with the central configuration settings. Central monitoring module 254 may generate an error if unsupported content is published to the central repository system 250. Central monitoring module 254 may send instructions to other applications to switch to or use a particular type of format when sending published content.

Figure 3:
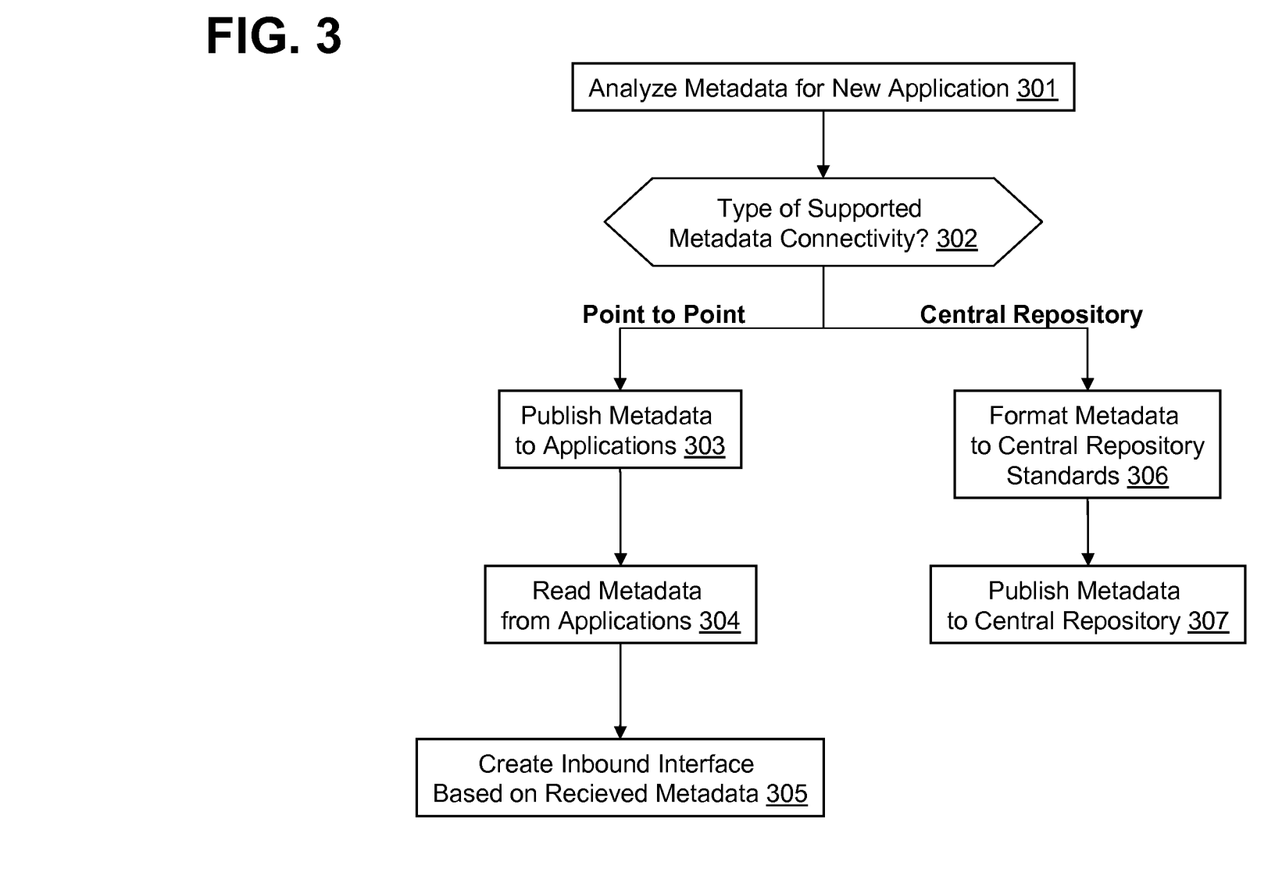
FIG. 3 shows an exemplary design time method in an embodiment of the invention.

FIG. 3 shows an exemplary design time method in an embodiment of the invention.

Once a new application component or functionality has been created, such as in the development environment 211 for example, content object metadata defining fields, objects, and other data used by the new component may be included in the metadata memory of the application system 210. In block 301, this metadata may be analyzed to identify other applications supporting interactivity with the fields and objects in the metadata. During this analysis, the fields and objects in the metadata may be identified. Additionally, the properties of other applications associated with the ERP system may be analyzed to determine which, if any, of the other applications support the identified field and objects.

This determination may be made by analyzing whether the other applications use similar fields and objects in a same context. For example, if a CRM application uses a customer id field in a sales order object to identify the customer purchasing an item and another application uses a customer id field to in an order fulfillment object to identify a customer receiving an item, then the customer id field in both applications may be used in the same context. A determination of whether fields are used in a same context may depend on the object and application in which the field is used. Logic and/or lookup tables may also be used to determine similar contexts of fields. Fields may also have different identifiers in different applications. For example, a customer id field may have an identifier "customer id" in one application but the same field may have an identifier "customer name" in another application. A lookup table may be used in these situations to identify similar fields with different names.

Once the analysis is complete and those other applications supporting the fields and objects in the metadata have been identified, a determination may be made as to the type of connectivity supported by the identified other applications in box 302. The primary types of connectivity may include point-to-point connectivity and central repository based connectivity, as discussed previously.

Point-to-point connectivity may be selected when another application includes an outbound point-to-point interface for the identified similar fields and objects corresponding to those in the new application component metadata. If no such interface exists, then central repository based connectivity may be selected. Alternatively, a lookup table may be used to determine the type of connectivity between different applications. Tags or other identifiers may also be included in different applications to identify those applications supporting point-to-point communications. The tags or other identifiers may also be used to determine the type of connectivity to be used. Connectivity information may be stored in the local configuration module 213 settings of the application system 210.

If point-to-point connectivity is selected for communications with at least one of the other applications, then in box 303, the application system with the new application component metadata may publish the metadata to those other applications with point-to-point connectivity. Publication may occur by making available the pertinent WSDL metadata stored in the application system to those other systems supporting point-to-point connectivity. The other systems supporting point-to-point connectivity may then use the metadata to create inbound interfaces. The inbound interfaces enable the other systems to properly identify data transferred during runtime through point-to-point communications.

In box 304, the application system with the new application component may also read the identified similar field and object metadata in those other application systems and in box 305, the application system may create, based on the read metadata, inbound interfaces for processing and properly identifying data received from those other systems during point-to-point communications.

If central repository based connectivity is selected for communications with at least one of the other application systems, in box 306, the application system may reformat the metadata according to the data structure used in the central repository so that the metadata may be seamlessly integrated into the central repository with the metadata from other application systems. In box 307, the metadata may be published to the central repository. After publication, the metadata may added to the central repository.

Figure 4:
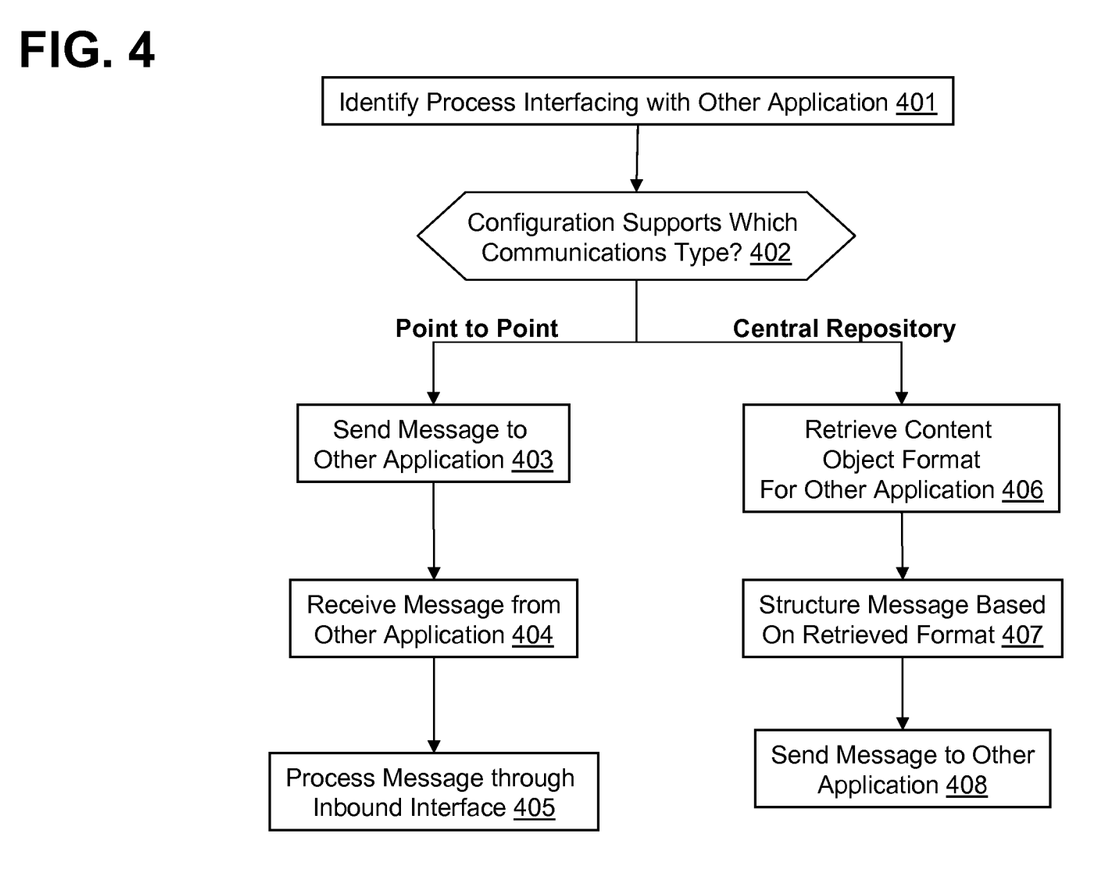
FIG. 4 shows an exemplary runtime method in an embodiment of the invention.

FIG. 4 shows an exemplary runtime method in an embodiment of the invention. In box 401, when a process in a first application system wants to interface with data used by another application system, both the process and the other application involved in the interfacing may be identified. In other embodiments, however, only the other application may be identified and not the process triggering the interfacing. Once both the process and the other application have been identified, a determination may be made as to the type of supported communications between the systems.

In box 402, the local configuration module 213 settings may be checked to determined the communication type supported by the identified process and/or the identified other application. The local configuration module 213 settings may contain identifiers specifying the situation in which each communication type may be supported. For example, the module 213 may contain a lookup table or logic indicating that particular processes, such as all encryption processes, may use central repository based communications. Alternatively, the module 213 may indicate that certain applications, such as an ERP application, may support point-to-point communications. The module 213 may also include more sophisticated logic, such as logic indicating that a first process interfacing with a first application may use point-to-point communications, while a second process interfacing with the first application and a first process interfacing with a second application may use central repository based communications. Other settings are also possible in different embodiments.

If the local configuration module 213 settings indicate that point-to-point communications are to be used, the first application system may send a message in box 403 containing object data that is to be shared with the other application system. The object data in the message may be formatted according to the corresponding metadata in the first application system. The other application system may then identify the object data by applying the inbound interface to the object data in the message that it previously created at design time based on the metadata in the first application system.

In box 404, a message containing object data from the other application system may be received at the first application system as part of the interfacing between applications. Once the message is received, in box 405 it may be processed through an inbound interface that was generated at design time when the first application system read the corresponding metadata in the other application system to generate the inbound interface. Processing the received message through the inbound interface may ensure that that the object data in the message is correctly read at the first application system. Once the object data has been processed the data may be used by the respective applications.

If the local configuration module 213 settings indicate that central repository based settings are to be used, in box 406 the first application system may communicate with the central repository to obtain object formatting instructions from the repository for the other application system. In some embodiments, the identified process and/or the identified application may be used by the central repository to identify the proper object formatting instructions. Other information may also be used in some embodiments.

In box 407, the first application system may structure a message to the other application system based on the instructions retrieved from the central repository. In box 408 the structured message may be sent to the other application system.

Figure 5:
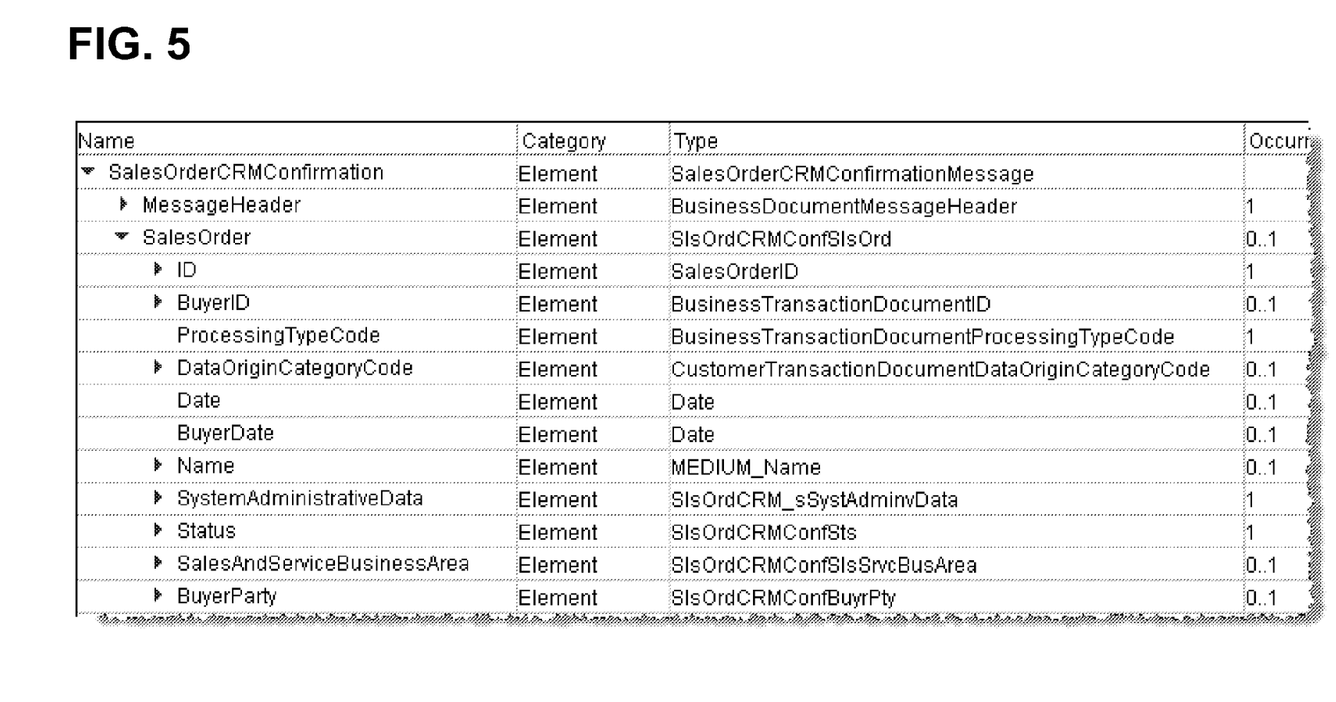
FIG. 5 shows an exemplary structure of content object metadata in an embodiment of the invention.

FIG. 5 shows an exemplary structure of content object metadata in an embodiment of the invention. The content object metadata in this example may be included as part of the metadata 212 in application system 210. The content object metadata may also be published 230 to the central repository system 250 and included as metadata 252 in the central repository system 250. The central repository system metadata may have a same structure as that of the metadata 212 in the application system 210 or it may have a different structure, in which case the published metadata in the application system 210 may be restructured in a format compatible with the central repository system 250.

The content object metadata shown in FIG. 5 contains identifiers of the fields, objects, and other data pertinent to a sales order confirmation message designated with the identifier SalesOrderCRMConfirmation. This metadata may be installed on a first application system as part of a new application component that generates or interacts with a sales order confirmation message in a CRM application. The metadata may be arranged hierarchically, with each of the sub-elements in the sales order confirmation message shown as subordinate to the SalesOrderCRMConfirmation identifier.

In this example, the metadata may indicate data that is included in a sales order confirmation message from a CRM application. For example, the message may contain a message header, as indicated by the identifier MessageHeader, and data from a sales order object, as indicated by the identifier SalesObject. This MessageHeader identifier may be associated with a particular message header structure. Fields from the sales order object that may be included in the message may be shown as subordinate to the sales order object. In this example, the fields shown include a sales order identifier, designated by the identifier ID, along with other fields designated by the identifiers BuyerID, ProcessingTypeCode, and so on. Although the metadata in FIG. 5 is shown in a table format, the metadata may also be stored in a WSDL format.

If the first application system is configured to use point-to-point communications when exchanging Sales Order Confirmation Messages with other application systems, then the first application system may make this metadata available to those other application systems. Each of these application systems may use the metadata to create inbound and/or outbound interfaces to process exchanged sales order confirmation messages between the systems. The interfaces may be used to correctly extract or include desired information in the messages. For example, if an application system wants to save or update the sales order ID, the interface may be created to extract or update the sales order ID data in the message using the metadata to identify the data in the message. The interface enables applications to filter specific fields and data in messages so that only desired data in messages are processed or included in the messages.

For example, if a CRM application wants to send a point-to-point sales order confirmation to another application in the ERP system, the CRM application may use an outbound interface to structure the confirmation message based on the metadata in the CRM application. The confirmation message may then be sent direct to the other application, where it may be processed by an inbound interface to identify data in the message relevant to the other application. Both interfaces may use the same SalesOrderCRMConfirmation metadata, but each interface may be customized to accommodate the requirements of each system.

If the first application system is configured to use central repository based communications when exchanging Sales Order Confirmation Messages with other application systems, then the first application system may publish its metadata to the central repository system. Other systems may then access the metadata on the central repository system when creating messages to send to other systems and processing messages received from other systems. Thus, the central repository system may be used as a hub for sending and receiving messages, where the metadata in the repository system is used to format outbound messages and process inbound messages between systems.

For example, if a CRM application wants to send a central repository based sales order confirmation to another application in the ERP system, the metadata in the central repository may be used to specify and identify data that may be transmitted to the other application as part of message. The other application system receiving this data may then extract relevant data from the transmitted data.

Figure 6:
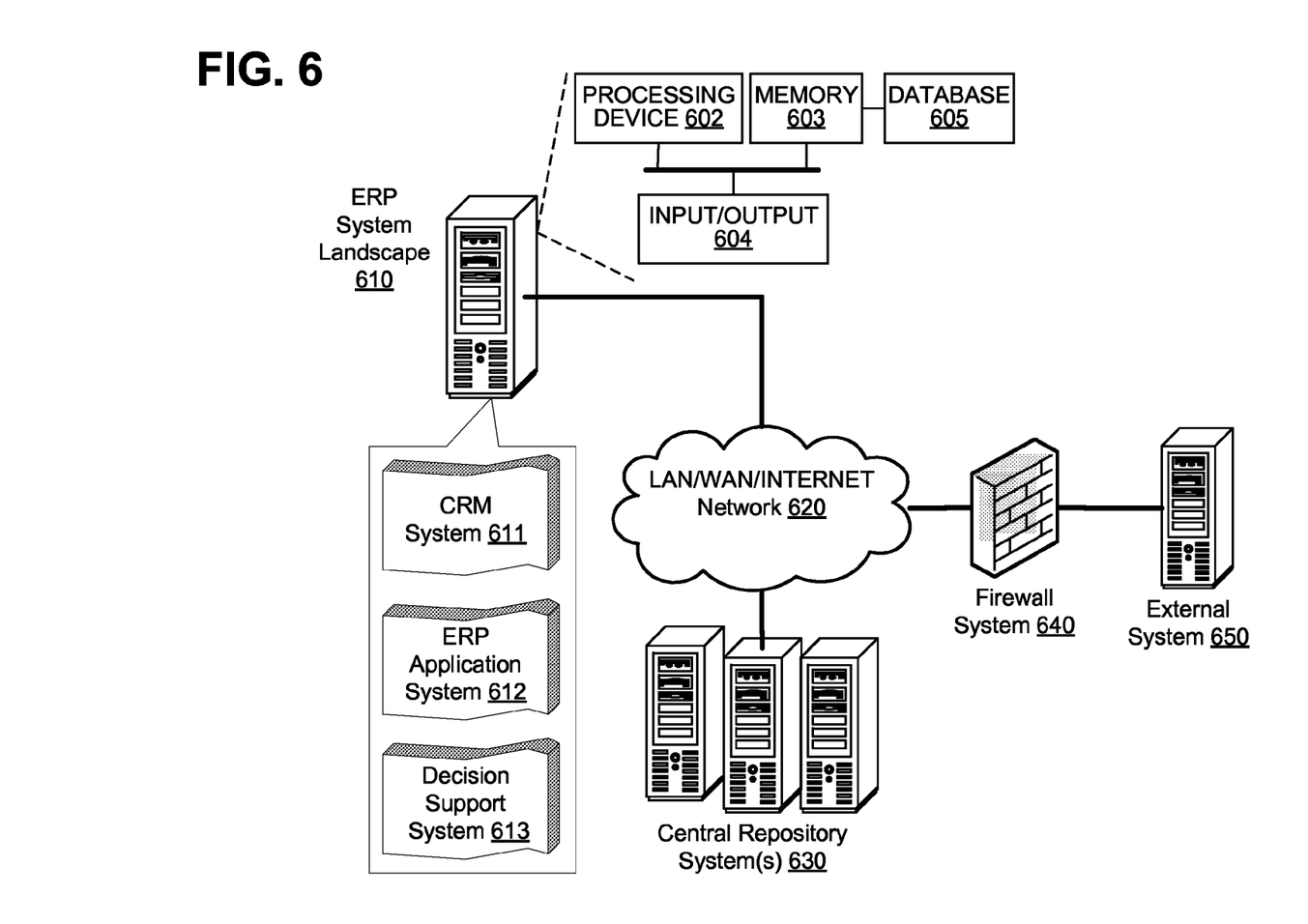
FIG. 6 shows an exemplary configuration of systems in an embodiment of the invention.

FIG. 6 shows an exemplary configuration of systems in an embodiment of the invention. In this example, an ERP system landscape 610 may be coupled to a central repository system 630 through a communications network 620 and an external system 650 through the communications network 620 and a firewall system 640. The external system 650 may be a third party system, such as a system belonging to a customer, supplier, transportation provider, or other third party. The ERP system landscape 610 may include other application systems as well, such as CRM system 611, ERP application system 612, and decision support system 613. Each of these application systems may be separate systems connected with the ERP system landscape 610 through the communications network 620. Alternatively, each of the systems 611 to 613 may be separate components of an integrated ERP landscape system 610. In some embodiments, the central repository system 630 may also be included as part of the ERP system landscape 610. The external system 650 may also be included as part of the ERP system landscape 610 in some embodiments.

The external system 650 may be connected to a firewall system 640 that may prevent the external system 650 from directly accessing other systems of the organization, including the ERP landscape 610, CRM 611, ERP application 612, decision support 613, and/or central repository 630 systems. If the external system 650 is under the control of the organization or is managed by a trusted third party, then it may bypass the firewall system 740 so that it may directly access the other systems of the organization.

Each of the systems in FIG. 6 may contain a processing device 602, memory 603 containing a database 605, and an input/output interface 764, all of which may be interconnected via a system bus. In various embodiments, each of the systems 610 to 613, 630, and 650 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 603 may contain different components for retrieving, presenting, changing, and saving data. Memory 603 may include a variety of memory devices, for example, Dynamic Random Access Memory (DRAM), Static RAM (SRAM), flash memory, cache memory, and other memory devices. Additionally, for example, memory 603 and processing device(s) 602 may be distributed across several different computers that collectively comprise a system.

Processing device 602 may perform computation and control functions of a system and comprises a suitable central processing unit (CPU). Processing device 602 may comprise a single integrated circuit, such as a micro-processing device, or may comprise any suitable number of integrated circuit devices and/or circuit boards working in cooperation to accomplish the functions of a processing device. Processing device 602 may execute computer programs, such as object-oriented computer programs, within memory 603.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, hard disks, floppy disks, or CD ROM; the Internet or other propagation medium; or other forms of RAM or ROM.

We claim:

1. A computer-implemented method comprising:
responsive to instantiating a first application at a processing device, analyzing metadata of the first application to identify a data object and a field of the data object exchanged with a second application over a communications network;
checking an identifier associated with a similar data object and a similar field to determine a supported connectivity between the applications;
responsive to the applications supporting point-to-point connectivity, providing metadata of the first application to the second application enabling the second application to create an inbound interface for extracting the identified data object and the identified field from runtime communications from the first application to the second application formatted according to the metadata at the first application; and
responsive to the applications supporting connectivity through a central repository, reformatting the metadata of the first application according to a data structure used by the central repository and publishing the reformatted metadata containing formatting instructions for transferring the identified data object and the identified field in communications with the first application to the central repository, the published metadata accessed at runtime to enable communication with the first application according to the formatting instructions in the published metadata.

2. The method of claim 1, wherein the metadata is stored in a WSDL format in an application system storing at least one of the applications.

3. The method of claim 2, wherein the metadata is stored in a WSDL format in the central repository.

4. The method of claim 3, wherein the WSDL format of metadata in the application system is different from that in the central repository.

5. The method of claim 4, further comprising converting the metadata from the WSDL format of the application system to that of the repository system before storing the published metadata in the central repository.

6. The method of claim 2, wherein the metadata is stored hierarchically, with a first level identifying a messaging object transmitted between applications, a second level identifying a data object having a data field with data transmitted as part of the messaging object, and a third level identifying the data field associated with the transmitted data.

7. The method of claim 1, wherein the checking of the identifier includes comparing each identifier with identifiers in a lookup table to determine whether each application supports point-to-point or central repository based connectivity.

8. The method of claim 1, wherein the checking an identifier includes checking the applications for an outbound point-to-point interface including the similar data object and the similar field and designating those applications with the outbound point-to-point interface as supporting point-to-point connectivity while designating others as supporting central repository based connectivity.

9. A computer-implemented method comprising:
responsive to a first process in an first application attempting communication with a second application, identifying, using a processing device, the second application;
checking a configuration setting of the first application to identify a connectivity mode with the second application, the configuration setting specifying different connectivity modes for different applications;
responsive to identifying a point-to-point connectivity mode, receiving a communication from the first application and extracting an identified data object and identified field data from the communication based on metadata previously provided by the first application to second application enabling the second application to create an inbound interface for extracting the identified data object and the identified field from runtime communications from the first application to the second application formatted according to the metadata at the first application; and
responsive to identifying a central repository based connectivity mode, retrieving metadata from the central repository reformatted by the first application according to a data structure used by the central repository and recognized by the second application and executing formatting instructions included in the retrieved metadata for transferring the identified data object and the identified field data between the applications to enable communication with the first application.

10. The method of claim 9, further comprising identifying the process attempting the communication, wherein the configuration setting specifies different connectivity modes for different processes and applications.

11. The method of claim 10, wherein a lookup table is used to determine a connectivity mode for the different processes and applications.

12. The method of claim 10, wherein logic is used to associate each connectivity mode with different processes and applications.

13. The method of claim 9, wherein metadata is stored in a WSDL format in at least one of the applications and in the central repository.

14. The method of claim 9, further comprising processing point-to-point communications through an outbound interface before sending them to the second application, the outbound interface excluding at least some data not used by the second application.

15. The method of claim 9, wherein the metadata is stored hierarchically, with a first level identifying a messaging object transmitted between applications, a second level identifying a data object having a data field with data transmitted as part of the messaging object, and a third level identifying the data field associated with the transmitted data.

16. The method of claim 9, further comprising processing a point-to-point communication received from the second application through an inbound interface to extract desired data from the received communication, the inbound interface identifying the desired data in the received communication for extraction.

17. The method of claim 1, further comprising, for point-to-point connectivity, creating an inbound interface for each application supporting point-to-point connectivity to extract desired data after reading metadata of each respective application to identify a field of a data object containing the desired data.

18. A system comprising:
- a plurality of application systems, each including a processing device and a memory and each connected to a central repository system; and
- a communications interface device connecting each of the application systems and the central repository system, where:
- a first application system analyzes metadata of a first application to identify a data object and a field of the data object used in a communication with a second application system;
- the first application system checks an identifier associated with a second application at the second application system having a similar data object and a similar field to determine a supported connectivity;
- responsive to the first application system determining that the second application supports point-to-point connectivity, the first application system provides metadata of the first application to the second application enabling the second application to create an inbound interface for extracting the identified data object and the identified field from runtime communications formatted according to the metadata at the first application system; and
- responsive to the first application system determining that the second application supports connectivity with the first application system through the central repository system, the first application system reformats the metadata of the first application according to a data structure used by the central repository and publishes the reformatted metadata containing formatting instructions for transferring the identified data object and the identified field in communications with the first application, the published metadata accessed at runtime by the second application system to enable communication with the first application according to the formatting instructions in the published metadata.

* * * * *